Figure 1:
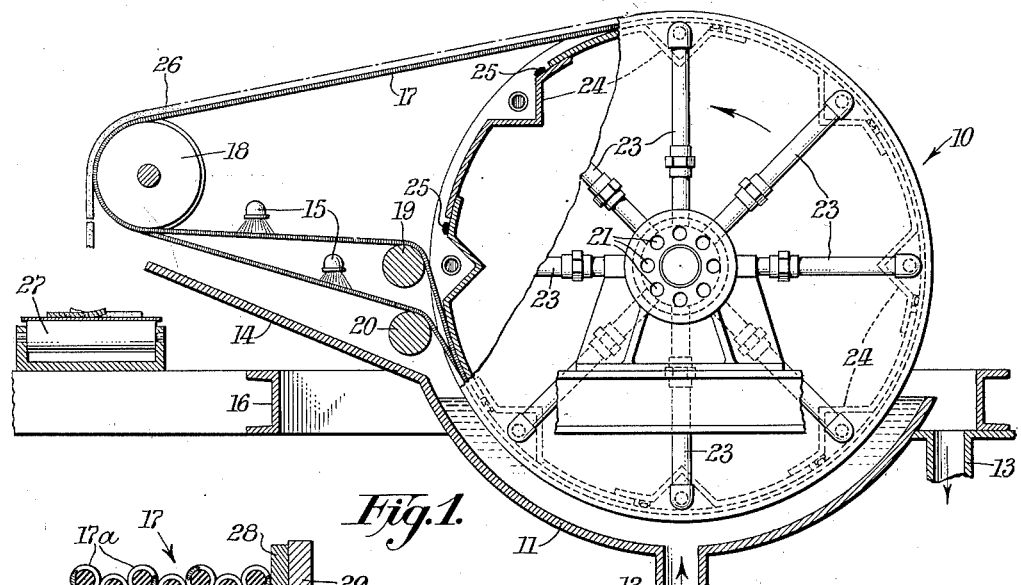

Jan. 29, 1952     T. R. KOMLINE     2,583,698

ROTARY DRUM VACUUM FILTER

Filed April 30, 1949

Inventor
Thomas R. Komline
By
Agent

Patented Jan. 29, 1952

2,583,698

UNITED STATES PATENT OFFICE 2,583,698

ROTARY DRUM VACUUM FILTER

Thomas R. Komline, Ridgewood, N. J., assignor to Komline-Sanderson Engineering Corporation, Ridgewood, N. J., a corporation of New Jersey Application April 30, 1949, Serial No. 90,697

4 Claims. (Cl. 210—3)

This invention relates to an improved method of filtration and to improved apparatus for performing filtering operations. The devices of my invention are particularly appropriate for accumulating, de-watering, conveying and discharging solids from sewage or industrial sludges.

An important object of my invention is to provide a method for dewatering liquid sludges continuously without progressive loss of filter efficiency due to blinding of the filter medium.

A further important object of my invention is to provide sludge filtration apparatus capable of continuous day-in, day-out performance which will operate efficiently with a minimum expense and a minimum of shut-down time for service or repair.

In the preferred physical embodiment of my invention, the apparatus employed may broadly be considered as a rotary vacuum filter having a traveling permeable filter medium rotating therewith over a portion of the periphery of the drum and trained away from the drum for the balance of the periphery to discharge filter cake. While trained away from the drum, the filter medium traverses a discharge roller, whereupon the accumulated solids drop to a belt conveyor or other instrumentality for ultimate sludge disposal. The filter medium of my invention is a web composed of a series of complementary helical spring filaments according to my earlier application, Serial Number 32,484 filed June 11, 1948, of which this application is a continuation-in-part.

The helical spring filaments are preferably of closely coiled convolutions and with a resilient deformable core, the latter of which completely fills the space inside of the coils. Likewise, each is ground on its outside surface to present a substantially cylindrical shape. When disposed on a cylindrical drum, the spring coils separate and provide interstices through which effluent may pass, but through which solids of filtration may not so pass. Leaving the drum, the filaments are directed to a remotely situated discharge roller of smaller diameter than the drum, over which they pass and reverse their direction for retraining back to the drum. By reason of the smaller diameter of the discharge roller, as compared with the diameter of the drum, the spring coils separate from each other to a greater extent than when resting on the drum, thus facilitating the discharge of filter cake. On the return to the drum the springs separate from each other into two layers after which they are sprayed with water or other cleansing liquid and are then given a reverse bend when passed over a pair of aligning rollers to be returned to the drum. This reversal effects a squeezing action which works loose or dilutes particles of solid material which may have remained in the spring interstices after discharge and spray cleaning and a cleaned and reconditioned spring filament structure is presented as the web reforms on the drum.

The invention will best be understood by reference to the annexed drawing, largely in diagrammatic style, taken in conjunction with the following specification.

Figure 3:
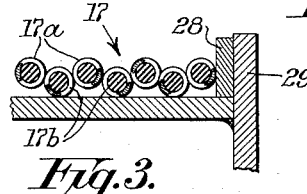
Figures 2, 5, 6:
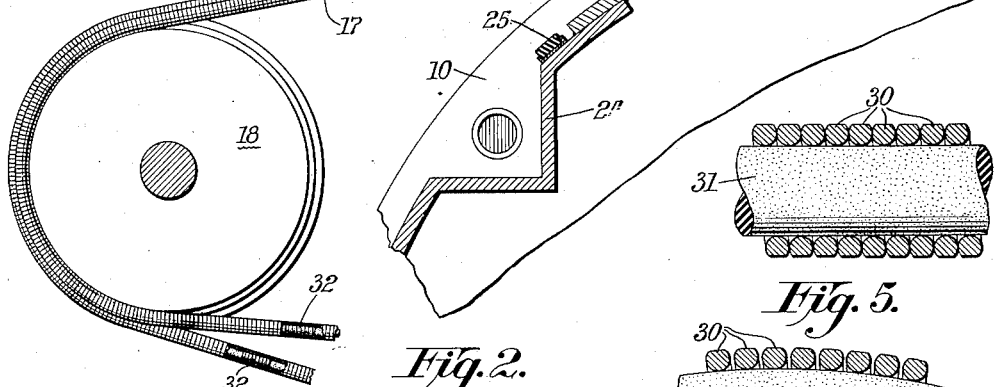
Figure 4:
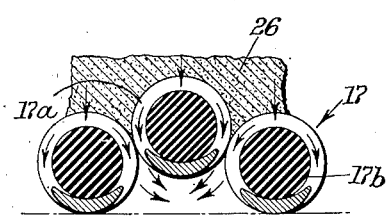

In the drawing:

Figure 1 is a diagrammatic side elevation view of a rotary drum filter according to my invention, parts of which are in cross-section, Figure 2 is an enlarged fragmentary cross-section view taken through the filter drum and discharge roller at Figure 1 to illustrate the filter medium used in the separation of solids from liquid, Figure 3 is a fragmentary cross-section view taken at the surface of the filter drum adjacent a drum head to illustrate the lay of the filter medium on the drum, Figure 4 is an enlarged cross-section view taken transversely through a portion of the filter medium resting on the drum illustrating the flow of effluent through the medium and the accumulation of solids thereon, Figure 5 is a longitudinal cross-section view taken through a section of a filter element filament in relaxed or normal condition, and Figure 6 is a view showing the filter filament of Figure 5 disposed over a curved surface.

Figure 1, a rotary vacuum filter drum 10 is axially supported for rotation while partly submerged in a tank 11 containing sludge to be filtered. Tank 11 conforms to the curvature of the drum and the drum length and is closely spaced therefrom for the purpose of preventing any unnecessary settling out or pocketing of solids introduced therein through the upwardly directed intake line 12 leading to a source of sludge. A spillway at the right hand side of the filter tank connects with an overflow line 13 in order to maintain an optimum liquid level in the tank, and projecting apron 14 on the left hand side provides return of wash water from spray headers 15, as will hereinafter be more fully considered. Support for the assemblage is had as by the use of suitable framework 16 and a motor drive, not shown, is connected with the drum to provide slow counterclockwise rotation as is illustrated by the directional arrow.

Drum 10 is constructed as a sectionalized structure, to be hereinafter more fully explained, and it carries a stranded filter web 17 which envelopes a substantial portion of its periphery between the drum heads; web 17 being trained off the drum at the left side and directed over a freely trunnioned discharge roller 18. The web is then divided and separated into two layers 17a and 17b and is trained back to the drum over a pair of grooved aligning or directioning rollers 19 and 20.

Vacuum is applied at specific areas on the drum surface under web 17 by means of a vacuum supply system, not shown, which is in communication with the drum during rotation through a suitable regulator valve to ports 21 in hub 22, ports 21 being in further communication with exterior radial piping members 23 interposed between the hub and the longitudinal drainage channel 24 in the imperforate drum surface. Adjacent each channel 24 and co-extensive therewith is a compartmental sealing strip 25 which is provided in order to sectionalize the drum so that vacuum may reach only those areas submerged in the liquid sludge or during the de-watering cycle following emergence of the drum from the sludge. Without some such provision there would be a loss of vacuum occuring as web 17 is trained away from the drum for the discharge of filter cake.

During rotation of the drum and with vacuum applied under the web, liquid will be drawn through the web and will flow circumferentially to the drainage channels 24 and then away from the drum through the piping members 23 and ports 21. At the same time solids which are restrained from passing through the filter medium will accumulate and form a sludge cake 26 on the drum which is continuously dewatered as the drum rotates out of tank 11 and until the topmost position of the drum is reached at which point the web is trained away carrying the cake to be discharged to a conveyor 27 or to be otherwise suitably disposed of.

Web 17, see Figures 2 and 3, is composed of a series of adjacent filtering strands or filaments which are arranged in side by side relationship across the surface of the drum between liners 28 on drum heads 29. Under the filaments are formed a series of circumferential channels along which filtrate may flow until it reaches the longitudinal channels 24, to be then diverted to the vacuum system piping. As the web becomes disassociated from the drum it acts as a conveyor to continuously carry sludge cake to the point of discharge, whereafter the strands become separated from each other, into layers 17a and 17b for washing and for re-association in their complementary form on the drum. For the purpose of properly aligning the strands throughout their cycle of movement, I prefer to groove the discharge roller 18 and the aligning rollers 19 and 20 according to the shape and size of the filaments. Furthermore, I carry this grooved effect to the drum by notching the individual separator sealing strips 25 located on the drum.

Each individual filament strand is constructed from a series of helical coils 30 of spring wire or the like within which is a resilient core 31, see Figures 5 and 6. When disposed over the curved surface of drum 10, the outside portion of the filament stretches slightly and provides impermeable zones separated by filtering interstices through which effluent may pass from above the web 17 to the channels therebelow, leaving the solids or filter cake on the surface as illustrated in Figure 4. While the illustrations disclose normally closed spring coils, initial longitudinal tension may be employed to increase the size of the filtering interstices if desired. The core material, chosen for its quality as being impervious to attack by the filtrate or solids, restricts flow of effluent to the interstices between coils, thus avoiding an accumulation of unwanted solids within the interior of the filaments and further prevents flow longitudinally of the filaments which would otherwise interfere with the vacuum effect at the drum compartments. A preferred material for the spring coils is stainless steel, chosen by reason of its resistance to oxidation and to other chemical action and, for the purpose of sealing the mating surfaces between adjacent filaments, I prefer to grind the outside diameter of the coils to a smooth polished finish simulating a cylindrical surface.

By reason of the commercial difficulties in obtaining springs of sufficient lengths to extend over the complete filament path, I use a number of shorter springs which are made endless by interconnection with internal studs 32, Figure 2. With adequate initial tensioning, springs 30 and cores 31 will track properly over the discharge roller 18 and over the aligning rollers 19 and 20 without jumping or appreciable sagging. If desired, the position of discharge roller 18 may be adjustably varied to and away from the drum 10 for regulation of filament tension.

As the filaments reach the discharge roller 18, which is substantially smaller in diameter than drum 10, the individual spring coils 30 separate at the outside to a greater extent than while on the drum and thereby aid in releasing the sludge for discharge as the web reverses direction. To further aid in the discharge of wet and thin cake which will not adequately release by reversal and the effect of gravity, a doctor blade or a series of tines, not shown, may be applied adjacent roller 18 to assist discharge. In this respect I find that steel or metal used as a constituent material for filaments 30 is highly satisfactory material to release sludge cake because of its substantial freedom from pores or strands such as are present in other filtering materials and tend to lock with fibres in the sludge.

During travel from discharge roller 18 back to the drum, as is hereinbefore referred to, one layer of filaments 17a, Figures 1 and 2, travels at a high level and the second layer of filaments 17b travels at a lower level permitting a thorough spray cleaning at headers 15. It will be noted that the spray headers are positioned in a manner whereby the high level strands are washed first so that residual material passing downward and intercepted by the low level strands will be washed during spraying of the lower strands. To facilitate separating at this point, I prefer to arrange the lower filaments on the drum and discharge roller on centers proportioned to effect a staggering effect as in Figures 3 and 4, as in this way firm contact is had between adjacent springs and wedging of the springs together is avoided.

Following the spray cleaning the spring filaments undergo a reversal in curvature as they pass over the aligning rollers 19 and 20. In this manner the portion of the coils which had been opened for filtration and discharge are now squeezed together thus assisting in ridding them of particles or fibres which may have clung through the washing operation.

It will be apparent to those who are skilled in the art of filtration that the drawings and description hereinbefore referred to are exemplary of features of my invention which may also be incorporated in or used with drum filters of alternate design. Thus, instead of training the filter web away from the drum to a discharge roller without filament separation, certain of the filaments may be separated from the others prior to reaching the discharge point in a known fashion or, further, the filter web may be restrained continuously on the drum. Likewise, the lay of the filaments may be varied and the deformable filler material which comprises the filament core may or may not be used, consistent with the requirements for restricting the flow of effluent. Still other departures may be made in the size and shape and arrangement of component parts of the preferred apparatus within the scope of my invention which is not to be considered as limited to the details disclosed herein, but rather is to be accorded the full scope of the claims so as to embrace any and all equivalent apparatus and procedure.

I claim:

1. The method of dewatering liquid sludge which includes the steps of draining effluent from solids between the impermeable convolutions of helical spring filaments resting on the surface of a rotating cylindrical drum, then passing at least some of the spring filaments off the drum and over a discharge roller, the effluent entering from the side of the helical spring filaments opposite that which rests on said cylindrical drum.

2. The method of dewatering liquid sludge which includes the steps of draining effluent from solids between the impermeable convolutions of helical spring filaments resting on a traveling cylindrical surface, the effluent entering between the convolutions from the side of the filaments opposite that which rests on said cylindrical surface, then passing at least some of the spring filaments over a second cylindrical surface of smaller diameter than the first cylindrical surface to separate the spring coils and discharge the accumulated solids.

3. The method of filtering liquid sludge which includes the steps of draining effluent from solids between the coils of helical spring filaments resting on a traveling cylindrical surface, the effluent entering between the coils from the side of the filaments opposite that in contact with said cylindrical surface, then passing at least some of the spring filaments over a cylindrical surface of smaller diameter but having the same direction of curvature as the first cylindrical surface to separate the spring coils during the discharge of accumulated solids.

4. The method of filtering liquid sludge which includes the steps of draining effluent from solids between the coils of helical spring filaments resting on a cylindrical surface, the effluent entering between the coils from the side of the filaments opposite that in contact with said cylindrical surface, then passing at least some of the spring filaments over a second cylindrical surface of smaller diameter than the first to separate the spring coils and discharge accumulated solids, and finally passing the spring filaments over cylindrical aligning surfaces providing a reversal in the direction of curvature of the filaments as compared with the curvature on said first and second cylindrical surfaces to squeeze out any foreign matter accumulated between the coils.

THOMAS R. KOMLINE.

REFERENCES CITED

The following references are of record in the file of this patent:

UNITED STATES PATENTS

| Number | Name | Date |
|---|---|---|
| 484,276 | Wright | Oct. 11, 1892 |
| 1,557,585 | Hele-Shaw | Oct. 20, 1925 |
| 1,876,123 | Wright | Sept. 6, 1932 |
| 2,247,460 | Wright | July 1, 1941 |